United States Patent

Puskas

[15] 3,655,924

[45] Apr. 11, 1972

[54] TAPE PICK-UP HEAD DEMAGNETIZER

[72] Inventor: Elek Puskas, Cherry Hill, N.J.

[73] Assignee: Steve Snyder Enterprises, Inc.

[22] Filed: Dec. 1, 1970

[21] Appl. No.: 94,017

[52] U.S. Cl. ...............179/100.2 D, 179/100.2 Z, 317/157.5

[51] Int. Cl. ......................................G11b 5/46, H01f 13/00

[58] Field of Search...............................317/157.5; 335/284; 179/100.2 D, 100.2 Z

[56] References Cited

UNITED STATES PATENTS

| | | | |
|---|---|---|---|
| 3,126,502 | 3/1964 | St. Denis | 335/284 |
| 2,481,392 | 9/1949 | Camras | 179/100.2 D |

OTHER PUBLICATIONS

Catalog 100, Lafayette Radio Electronic Corp. Syosset L.I. NY. 1969, Aug. 69, p. 114, 115

*Primary Examiner*—Bernard Konick
*Assistant Examiner*—Jay P. Lucas
*Attorney*—Clarence A. O'Brien and Harvey B. Jacobson

[57] ABSTRACT

The pick-up head of a magnetic tape player is demagnetized by a moving, alternating magnetic field generated within the front end portion of a cartridge-type housing inserted into the player. The drive capstan of the player drives a carrier on which magnets are mounted to produce said alternating magnetic field. The carrier is reciprocated through a predetermined stroke relative to the pick-up head by an actuating mechanism.

13 Claims, 14 Drawing Figures

Elek Puskas
INVENTOR.

BY Clarence A. O'Brien
and Harvey B. Jacobson
Attorneys

Patented April 11, 1972

3,655,924

3 Sheets-Sheet 2

Elek Puskas

INVENTOR.

BY Clarence A. O'Brien and Harvey B. Jacobson

Attorneys

Patented April 11, 1972

3,655,924

3 Sheets-Sheet 3

Elek Puskas

INVENTOR.

BY Clarence A. O'Brien and Harvey B. Jacobson

Attorneys

TAPE PICK-UP HEAD DEMAGNETIZER

This invention relates in general to the demagnetization of magnetic heads associated with tape players and more particularly players for magnetic tape cartridges.

It is commonly known that a tape player after frequent use, collects foreign matter such as magnetic particles transferred from the magnetic tape onto the surfaces of the magnetic pick-up head. This results in an accumulation of residual magnetism and increased noise appearing in the reproduced signal and a lowering of the signal to noise ratio.

Demagnetizers which remove residual magnetism from a surface by movement of the surface through an alternating magnetic field of diminishing intensity, are well known. Demagnetizers for magnetic heads have also been devised as disclosed for example in U.S. Pat. No. 3,435,300. However, removal of residual magnetism from relatively inaccessible magnetic heads associated with tape cartridge types of players, creates a special problem. It is therefore an important object of the present invention to provide a demagnetizer for the pick-up head of a tape cartridge type of player in a rapid and efficient manner and without disassembling of any parts.

In accordance with the present invention, a pick-up head demagnetizer is mounted within the same type of cartridge housing that normally carries the tape to be inserted into the player body. Accordingly, when the cartridge housing is inserted into the player body, the drive capstan and pick-up head associated with the player are operatively positioned relative to the housing for efficient and rapid removal of residual magnetism from the pick-up head by the demagnetizer. The tape reel normally enclosed within the cartridge housing is replaced by the demagnetizer while the pinch roller forms part of the demagnetizer mechanism. Thus, the pinch roller is engaged with the drive capstan to impart rotation to a carrier member on which magnetic elements are mounted in order to generate an alternating magnetic field adjacent to the magnetic head projecting into the front end of the cartridge housing. By means of an actuating mechanism, the carrier is oscillated through a predetermined stroke while being driven by the pinch roller so that in one direction of the stroke, the magnetic head will be subjected to an alternating magnetic field of diminishing intensity in order to effect demagnetization.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 5, 6, 7, 8:
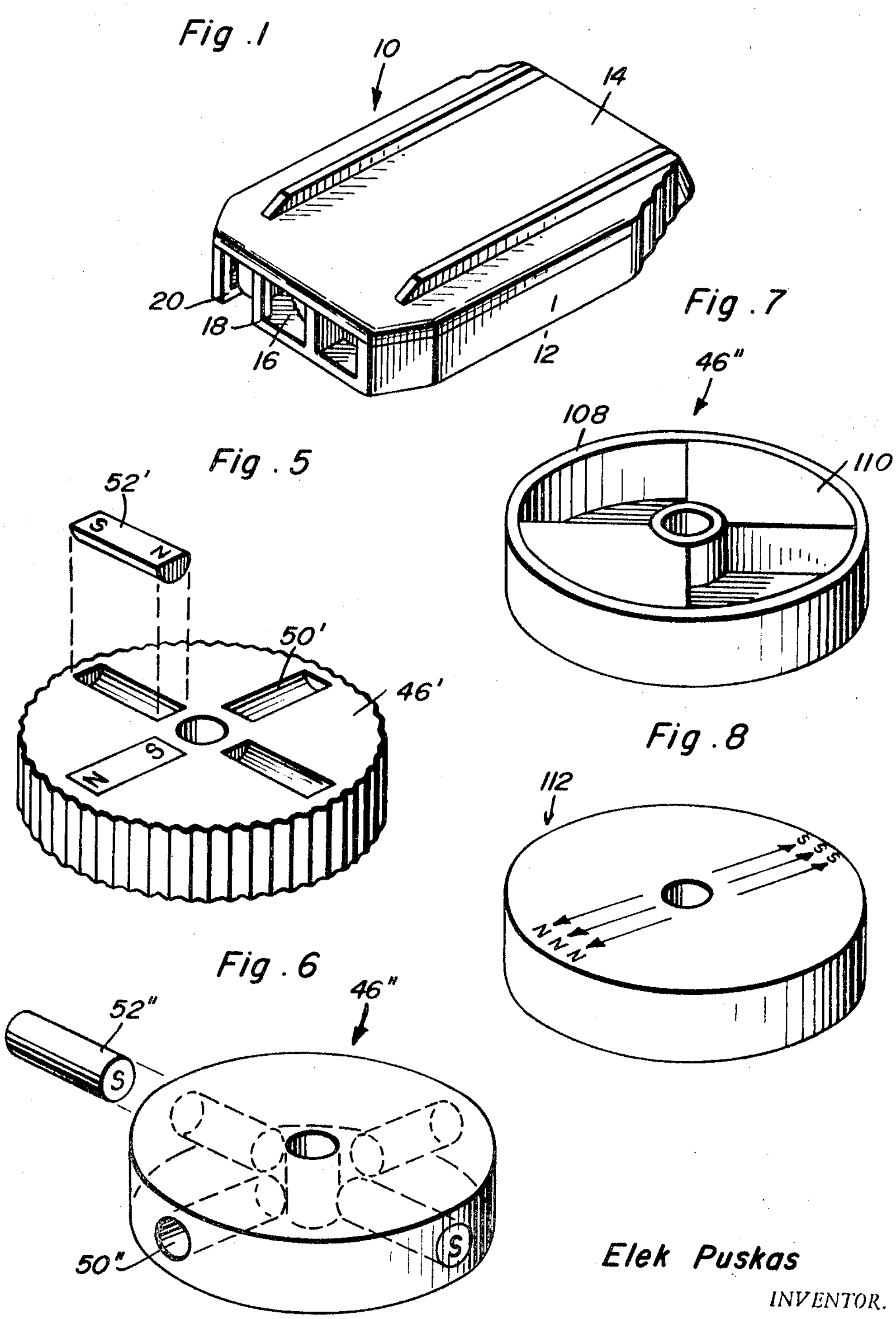
FIG. 1 illustrates a typical tape cartridge type of housing enclosing the demagnetizer of the present invention.
FIG. 5 is a perspective view of the magnetic element carrier associated with the device illustrated in FIGS. 2, 3 and 4.
FIG. 6 is a perspective view showing a second form of magnetic carrier.
FIG. 7 is a perspective view showing a third form of magnetic carrier.
FIG. 8 is a perspective view showing a fourth form of magnetic carrier.

Referring now to the drawings in detail, FIG. 1 illustrates a tape cartridge type housing generally denoted by reference numeral 10 which is similar in construction to the tape cartridge housing disclosed in U.s. Pat. No. 3,482,792. This housing generally includes a base portion 12 interfitted with a top cover portion 14. The space enclosed within the housing 10 ordinarily carried a tape reel storing magnetic tape for movement past a magnetic head which is adapted to project into the opening 16 at the front end 18 of the housing. The housing is also provided with a cutout portion 20 into which the drive capstan of the tape player projects.

Figures 2, 3, 4:
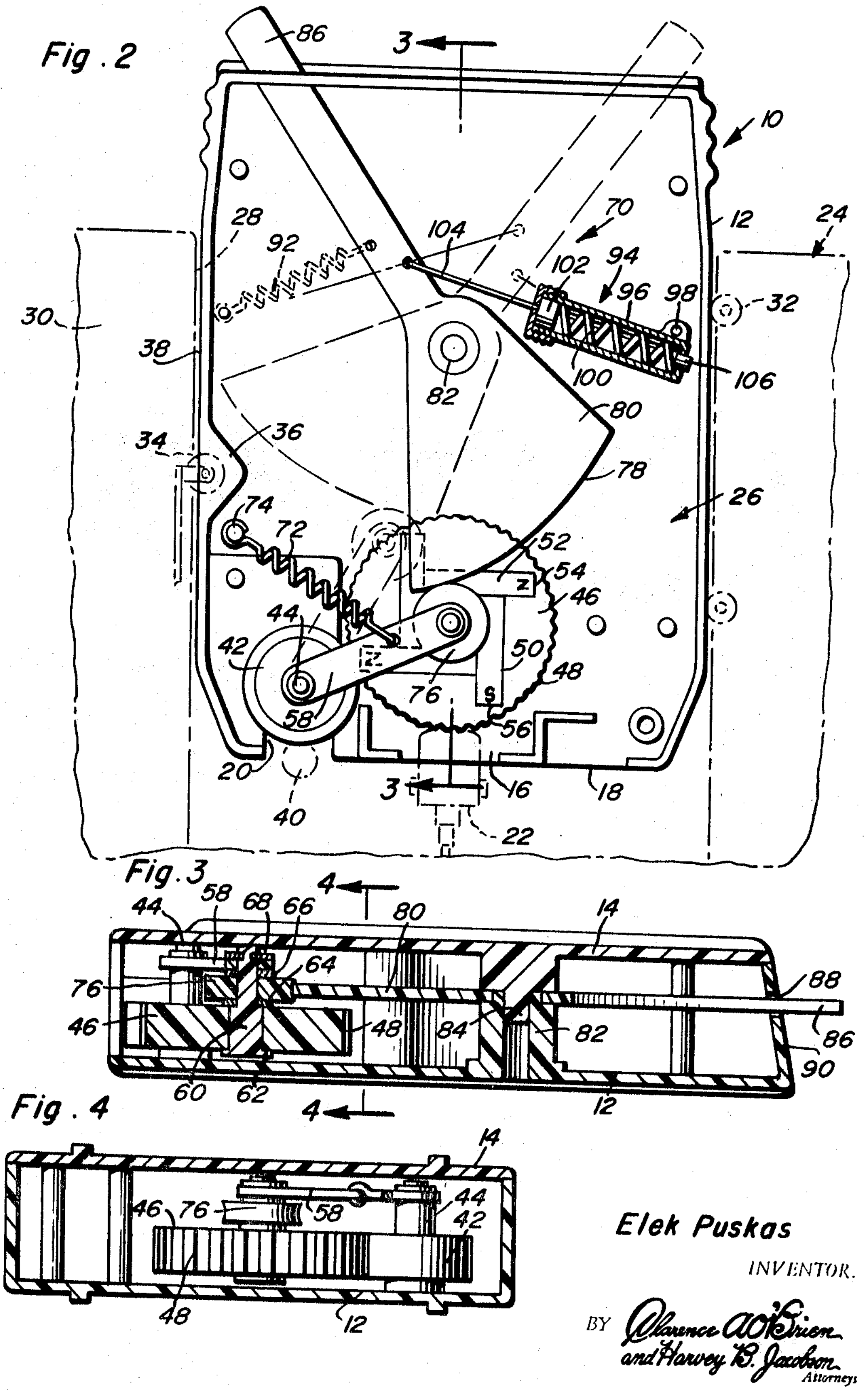
FIG. 2 is a top plan view of the demagnetizer with the top cover removed, shown inserted within as associated tape player.
FIG. 3 is a longitudinal sectional view taken substantially through a plane indicated by section line 3—3 in FIG. 2.
FIG. 4 is a transverse sectional view taken substantially through a plane indicated by section line 4—4 in FIG. 3.

In accordance with the present invention, the tape reel is removed from the housing 10 in order to accommodate a demagnetizer 26 as shown in FIG. 2. The magnetic pick-up head 22 associated with the tap player 24 is operatively positioned relative to the demagnetizer mechanism when the cartridge housing 10 is operatively positioned within the slotted opening 28 of the player body 30. The player 24 may be of the type disclosed in U.S. Pat. No. 3,437,762 including guide rollers 32, retention roller 34 received in the notch formation 36 on the side wall 38 when the housing is in an operative position within the player body. In this operative position, the drive capstan 40 projects into the aforementioned cutout 20 in order to drivingly engage the pinch roller 42 through which the drive capstan ordinarily imparts movement to the tape, this pinch roller being retained as part of the demagnetizer mechanism 26 in accordance with the present invention. Accordingly, the pinch roller 42 is mounted on a post 44 establishing a fixed rotational axis for the roller within the cartridge housing.

In the embodiment illustrated in FIGS. 2, 3 and 4, the demagnetizer mechanism 26 includes a carrier wheel or rotor 46 having a roughened or serrated periphery 48 so as to be in frictional driving engagement with the pinch roller 42 through which rotation is transmitted from the drive capstan 40 to the carrier wheel 46. The carrier wheel 46 is made of non-magnetic material and is provided with recesses 50 within which bar magnets 52 are seated and cemented or otherwise secured in place. The bar magnets 52 are so arranged so that end pole faces 54 and 56 of opposite polarity alternate adjacent the periphery of the carrier wheel. In this manner, an alternating magnetic field is established adjacent the insert opening 16 during rotation of the carrier wheel.

The carrier wheel is operatively positioned adjacent to the opening 16 by means of a support arm 58 which is pivotally mounted about the fixed axis through the post 44 on which the pinch roller 42 is rotatable. The end of the support arm 58 opposite the post 44 is pivotally connected to a stub shaft 60 on which the carrier wheel 46 is rotatably mounted between a lower flange portion 62 and a thrust washer 64. The support arm 58 is held axially assembled on the reduced diameter portion of the stub shaft 60 by the washer 66 and retainer 68 in axially spaced relation to the carrier wheel 46. Thus, the rotational axis for the carrier wheel 46 is movable about the axis of the fixed post 44 as a center in order to maintain the carrier wheel 46 in driving engagement with the pinch roller 42 while the carrier wheel is reciprocated or oscillated through a predetermined stroke by means of an actuating mechanism generally referred to by reference numeral 70.

The actuating mechanism oscillates the carrier wheel 46 between a limit position as shown by solid line in FIG. 2 wherein the pick-up head 22 is exposed to an alternating magnetic field of maximum intensity and an opposite limit position remote from the pick-up head. Thus, as the carrier wheel 46 is displaced from the limit position shown in FIG. 2 to its other limit position, the pick-up head 22 will be exposed to an alternating magnetic field of diminishing intensity effective to demagnetize the head. The carrier wheel 46 is displaced to this other limit position remote from the pick-up head 22 under the continuous bias of a follower spring 72, one end of which is fixed to the housing by the anchor 74 and the other end connected to the support arm 58. A follower roller 76 is rotatably mounted on the stub shaft 60 between the carrier wheel 46 and the end of the support arm 58 for engagement with the cam surface 78 on a sector cam member 80 pivotally mounted on the bearing member 82 projecting from the base portion 12 of the cartridge housing which ordinarily mounts the tape reel. A projection 84 on the cover 14 of the housing is received within the bearing member 82 for holding the cam member 80 assembled in position for angular displacement between the solid line position and the dotted line position as shown in FIG. 2. Since the follower roller 76 is urged into engagement with the cam surface 78 by spring 72, the carrier wheel 46 and the support arm 58 will be angularly displaced in one direction through its stroke from the solid line position to the dotted line position shown in FIG. 2. Therefore, in order to effect demagnetization of the pick-up head when the cartridge housing is in position, the operator displaces the cam member 80 by means of an actuating arm 86. The actuating arm projects rearwardly from the cam member through a slot 88 formed in the rear wall 90 of the housing for this purpose.

Movement of the rotating carrier wheel 46 from which an alternating magnetic field is generated, may be effected at a controlled rate under manual control of the operator displacing the actuating arm 86 from one end of the slot 88 to the other against the bias of a return spring 92 as shown by dotted line in FIG. 2. Alternatively, movement of the actuating mechanism in the operating direction may be regulated by means of a 96 device 94 which includes, for example, a cylinder 96 pivotally mounted at 98 in the housing enclosing a return spring 100 biasing the actuating arm 86 to the limit position shown by solid line through the piston 102 and piston rod 104 pivotally connected to the actuating arm. An adjustable bleed valve 106 is mounted on the end of the cylinder 96 opposite the piston 102 in order to controllably retard displacement of the piston 102 and the cam member 80 to which it is connected through the actuating arm 86. Thus, the rate of movement with which the cam member is displaced in one direction through the actuating arm 86 is regulated in order to efficiently effect demagnetization. The bleed valve 106 is of the one-way type so that in the return direction, the spring 102 may rapidly displace the magnetic field generating device to its start position as shown by solid line in FIG. 2.

FIG. 5 illustrates a modified form of magnetic generating device wherein the carrier wheel is replaced by a carrier wheel 46′ provided with radial recesses 50′ receiving bar magnets 52′. The pole faces on the bar magnets are accordingly arranged perpendicular to the radii rather than at an angle thereto as in the case of the carrier wheel 46 shown in FIG. 2.

In FIG. 6, another form of carrier wheel 46″ is shown wherein cylindrical bar magnets 52″ are completely embedded and radially arranged within the body of the carrier wheel which is provided with cylindrical sockets 50″ for this purpose. In FIG. 7, the carrier wheel 46‴ includes a rim 108 enclosing a pair of magnetic segments 110. The magnetic segments accordingly expose arcuate pole faces of opposite polarity at the rim 108 for producing the demagnetizing action as hereinbefore described in connection with the other forms of the invention. The carrier wheels hereinbefore described, on which the magnetic elements are mounted, may also be replaced by a disk 112 as shown in FIG. 8 that is magnetized across its diameter as illustrated.

Figure 9:
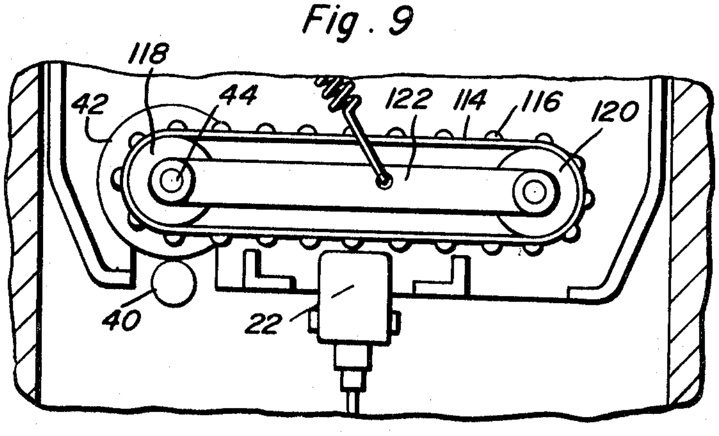
FIG. 9 is a top sectional view showing a modified form of demagnetizer employing yet another type of magnetic carrier.
Figure 10:
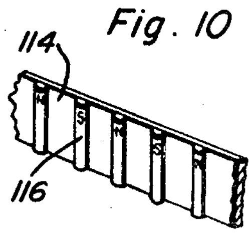
FIG. 10 is a perspective view showing a portion of the carrier illustrated in FIG. 9.

The alternating magnetic field of diminishing intensity may also be generated by mounting of magnetic elements on other types of carriers such as an endless belt 114 as shown in FIGS. 9 and 10. Spaced bar magnets 116 are accordingly mounted externally on the belt with pole faces of opposite polarity adjacent to each other in order to produce the alternating magnetic field as the bar magnets are brought into and out of proximity of the magnetic head 22. One end of the belt is accordingly entrained about a drive roller 118 rotatably mounted by the post 44 on which the pinch roller 42 is mounted in engagement with the drive capstan 40. The belt is also entrained about an idler roller 120 spaced from the drive roller 118 by means of the support arm 122 pivotally mounted on the post 44.

Figure 11:
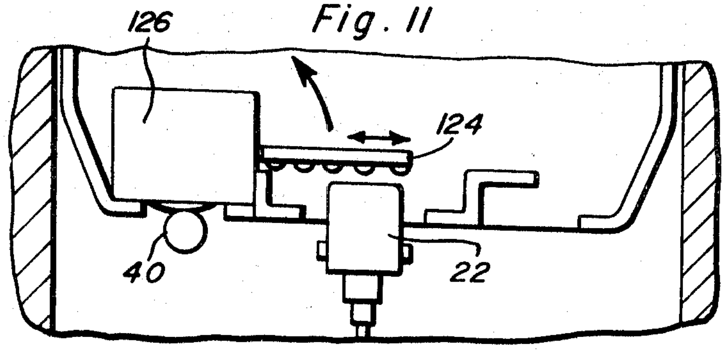
FIG. 11 is a top sectional view showing a still further modification of the demagnetizer employing yet another type magnetic carrier.
Figure 12:
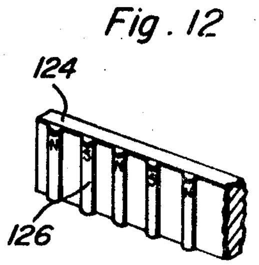
FIG. 12 is a perspective view showing a portion of magnetic carrier illustrated in FIG. 11.

FIGS. 11 and 12 illustrate a reciprocating type of carrier 124 on which bar magnets 126 are mounted. A reciprocating drive mechanism 126 of any suitable type driven by the drive capstan 40 imparts the desired reciprocatory movement to the reciprocating carrier 124.

Figure 13:
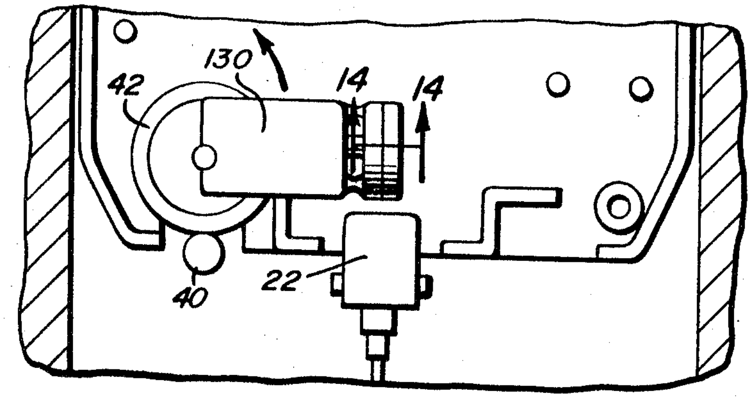
FIG. 13 is a top sectional view of a still further modification of the demagnetizer utilizing a different type of magnetic field generating device.
Figure 14:
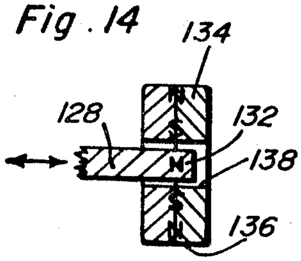
FIG. 14 is an enlarged partial sectional view taken substantially through a plane indicated by section line 14—14 in FIG. 13.

FIGS. 13 and 14 illustrate another type of magnetic field generating means in the form of a bar magnet 128 reciprocated by means of a reciprocating drive mechanism 130 to which an input is imparted through the pinch roller 42 as in the case of the other carrier drive devices hereinbefore described. One end pole 132 of the reciprocating bar magnet 130 is received within an annular magnetic member 124 having an outer peripheral face 136 and an inner peripheral face 138 of opposite magnetic polarity. Reciprocation of the end pole 132, opposite in polarity to that of the inner face 138, will accordingly produce an alternating magnetic field adjacent to the magnetic head 22 to be demagnetized. As in the case of the magnetic field generating means illustrated in FIG. 2, the magnetic field generating means shown respectively in FIGS. 9, 11 and 13 are displaced from a start position adjacent to the pick-up head so that the pick-up head will be demagnetized as the alternating magnetic field diminishes in intensity relative to the head.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a magnetic tape player having a body adapted to receive a cartridge housing, a magnetic pick-up head and a drive device rendered operative when said cartridge housing is operatively positioned within the player body, a demagnetizer for the pick-up head enclosed within the cartridge housing comprising a drive member rotatably mounted about an axis fixed within the housing for operative engagement with the drive device, magnetic means driven by the drive member for generating an oscillating magnetic field, means mounting said magnetic means for displacement from the vicinity of the magnetic head while driven by the drive member, and actuating means for imparting said displacement to the magnetic means at a controlled rate of movement, said actuating means including an actuating arm pivotally mounted within the housing and projecting therefrom, and drive means connected to the arm and engageable with the magnetic means for displacement thereof relative to the magnetic head through a predetermined stroke.

2. The combination of claim 1 wherein the drive means further includes dashpot means for regulating movement of the magnetic means in one direction through said predetermined stroke.

3. The combination of claim 1 wherein said mounting means includes a member supporting the magnetic means for oscillation about said fixed axis.

4. The combination of claim 3 wherein said magnetic means includes a carrier driven by the drive member, and a plurality of magnetic elements mounted on the carrier undergoing cyclic movement.

5. The combination of claim 4 wherein said carrier is a rotor carried by said mounting means having a periphery in driving engagement with the drive member.

6. The combination of claim 5 wherein said rotor is rotatable about a movable axis parallel to the fixed axis.

7. The combination of claim 6 wherein said magnetic elements expose pole faces of opposite polarity adjacent to said periphery of the carrier.

8. The combination of claim 7 wherein said drive means includes a cam connected to the arm, a follower mounted on the magnetic means and spring means continuously biasing the follower into engagement with the cam.

9. The combination of claim 8 wherein the drive means further includes dashpot means for regulating movement of the magnetic means in one direction through said predetermined stroke.

10. In combination with a magnetic tape player having a body adapted to receive a cartridge housing, a magnetic pick-up head and a drive device rendered operative when said cartridge housing is operatively positioned within the player body a demagnetizer for the pick-up head enclosed within the cartridge housing comprising a drive member rotatably mounted about an axis fixed within the housing for operative engagement with the drive device, magnetic means driven by the drive member for generating an oscillating magnetic field, means mounting said magnetic means for displacement from the vicinity of the magnetic head while driven by the drive member, and actuating means for imparting said displacement to the magnetic means at a controlled rate of movement, said magnetic means including an endless belt driven by the drive member and a plurality of magnetic elements mounted on the endless belt.

11. In combination with a magnetic tape player having a body adapted to receive a cartridge housing, a magnetic pick-up head and a drive device rendered operative when said cartridge housing is operatively positioned within the player body, a demagnetizer for the pick-up head enclosed within the cartridge housing comprising a drive member rotatably mounted about an axis fixed within the housing for operative engagement with the drive device, magnetic means driven by the drive member for generating an oscillating magnetic field, means mounting said magnetic means for displacement from the vicinity of the magnetic head while driven by the drive member, and actuating means for imparting said displacement to the magnetic means at a controlled rate of movement, said magnetic means including a reciprocating carrier driven by the drive member, and a plurality of magnetic elements mounted on the carrier undergoing cyclic movement.

12. In combination with a magnetic tape player having a body adapted to receive a cartridge housing, a magnetic pick-up head and a drive device rendered operative when said cartridge housing is operatively positioned within the player body, a demagnetizer for the pick-up head enclosed within the cartridge housing comprising a drive member rotatably mounted about an axis fixed within the housing for operative engagement with the drive device, magnetic means driven by the drive member for generating an oscillating magnetic field, means mounting said magnetic means for displacement from the vicinity of the magnetic head while driven by the drive member, and actuating means for imparting said displacement to the magnetic means at a controlled rate of movement, said magnetic means including an annular magnetic member having an inner and outer peripheral pole face of opposite polarity, and a reciprocating member having an end pole movable into the annular member of a polarity opposite to that of the inner peripheral face.

13. In combination with a cartridge housing having a front end into which a drive capstan and a magnetic head are adapted to project, a demagnetizer for the magnetic head comprising roller means rotatably mounted about an axis fixed within the housing for engagement with the drive capstan, magnetic means driven by the roller means for generating an oscillating magnetic field, means mounting said magnetic means for pivotal movement about said fixed axis from the vicinity of the magnetic head while driven by the roller means, and actuating means for imparting said pivotal movement to the magnetic means at a controlled rate of movement, said actuating means including an actuating arm pivotally mounted within the housing and projecting therefrom, and drive means connected to the arm and engageable with the magnetic means for displacement thereof relative to the magnetic head through a predetermined stroke.

* * * * *